(12) United States Patent
Kidwas et al.

(10) Patent No.: US 11,938,693 B2
(45) Date of Patent: Mar. 26, 2024

(54) MACHINE AND METHOD FOR DISASSEMBLING A LENS MOLD ASSEMBLY

(71) Applicant: ESSILOR INTERNATIONAL, Charenton-le-Pont (FR)

(72) Inventors: Wimon Kidwas, Bangkok (TH); Nelson Morales, Bangkok (TH)

(73) Assignee: Essilor International, Charenton-le-Pont (FR)

( * ) Notice: Subject to any disclaimer, the term of this patent is extended or adjusted under 35 U.S.C. 154(b) by 326 days.

(21) Appl. No.: 17/174,795

(22) Filed: Feb. 12, 2021

(65) Prior Publication Data

US 2021/0252812 A1 Aug. 19, 2021

(30) Foreign Application Priority Data

Feb. 13, 2020 (EP) ..................................... 20305137

(51) Int. Cl.
*B29D 11/00* (2006.01)
*B29C 33/30* (2006.01)
(Continued)

(52) U.S. Cl.
CPC ...... *B29D 11/00221* (2013.01); *B29C 33/303* (2013.01); *B29C 39/36* (2013.01); *B29D 11/00432* (2013.01); *B29L 2011/0016* (2013.01)

(58) Field of Classification Search
CPC ..... B29C 33/48; B29C 37/0007; B29C 39/36; B29D 11/00009; B29D 11/00192;
(Continued)

(56) References Cited

U.S. PATENT DOCUMENTS

| 6,082,987 A | 7/2000 | Su et al. | |
| 2004/0232573 A1* | 11/2004 | Nakamura | ....... B29D 11/00413 264/1.32 |
| 2019/0106243 A1* | 4/2019 | Maroofian | ......... B65D 21/0206 |

FOREIGN PATENT DOCUMENTS

| EP | 3 233 446 | 10/2017 | |
| EP | 3233446 B1 * | 8/2019 | ............. B29C 33/20 |

(Continued)

OTHER PUBLICATIONS

European Search Report for EP 20 30 5137 dated Aug. 6, 2020, 7 pages.

*Primary Examiner* — Philip C Tucker
*Assistant Examiner* — Jimmy R Smith, Jr.
(74) *Attorney, Agent, or Firm* — NIXON & VANDERHYE (57) ABSTRACT

A machine for disassembling a lens mold assembly including a first mold part, a second mold part, and a molded-lens sandwiched therebetween. The machine includes a centering unit to center the lens mold assembly. The machine includes a disassembling module having a mold engagement mechanism to engage the first and second mold parts to clamp and move the lens mold assembly. The disassembling module includes a molded-lens holder mechanism having at least two clamping members to clamp the molded-lens of the lens mold assembly. The machine includes an alignment guidance module to detect relative positions between the molded lens of the lens mold assembly and the molded-lens holder mechanism to align the molded lens for clamping by the molded-lens holder mechanism. The mold engagement mechanism is configured to hold the first and second mold parts individually and to separate the first and second mold parts from the molded lens.

20 Claims, 6 Drawing Sheets

(51) Int. Cl.
*B29C 39/36* (2006.01)
*B29L 11/00* (2006.01)

(58) Field of Classification Search
CPC ........ B29D 11/00221; B29D 11/00432; B29L 2011/0016
USPC ................ 425/182, 344, 345, 352, 353, 354
See application file for complete search history.

(56) References Cited

FOREIGN PATENT DOCUMENTS

| | | |
|---|---|---|
| WO | 02/087842 | 11/2002 |
| WO | 2016/097739 | 6/2016 |

* cited by examiner

MACHINE AND METHOD FOR DISASSEMBLING A LENS MOLD ASSEMBLY

CROSS-REFERENCE TO RELATED APPLICATIONS

This application is a U.S. Non-Provisional Application which claims priority to EP 20305137.0 filed Feb. 13, 2020, the entire contents of each of which are hereby incorporated by reference.

FIELD

Various embodiments generally relate to a machine for disassembling a lens mold assembly comprising a first mold part, a second mold part, and a molded-lens sandwiched between the first mold part and the second mold part. Various embodiments also relate to a method of disassembling a lens mold assembly comprising a first mold part, a second mold part, and a molded-lens sandwiched between the first mold part and the second mold part.

BACKGROUND

Conventional method for lens manufacturing is typically via manual molding. Typically, liquid molding materials are manually filled into a cavity between two molding shells so as to form a molded lens therebetween. Subsequently, the two molding shells are manually separated from the molded lens to retrieve the molded lens. The main problem in manually molding lens is a problem of efficiency. For example, the manual process limits production yield and is prone to human error which may damage the molded lens or the molding shells during retrieval.

Accordingly, there is a need to provide a more efficient solution with high accuracy to address at least some of the issues in the lens manufacturing process.

SUMMARY

According to various embodiments, there is provided a machine for disassembling a lens mold assembly including a first mold part, a second mold part, and a molded-lens sandwiched between the first mold part and the second mold part. The machine may include a centering unit having at least two pusher members movable relative to each other along a centering-movement plane to converge towards a pre-determined position in the centering-movement plane for pushing the lens mold assembly laterally and align the lens mold assembly to the pre-determined position. The machine may include a disassembling module. The disassembling module may include a mold engagement mechanism having a first engagement member and a second engagement member movable towards each other to provide a first clamping action along a first clamping-axis perpendicular to the centering-movement plane for respectively engaging the first and second mold parts such that the first and second engagement members clamp the lens mold assembly. The first and second engagement members may be further movable in a synchronous manner along a movement direction parallel to the first clamping-axis for moving the clamped lens mold assembly held by the first and second engagement members. The disassembling module may include a molded-lens holder mechanism having at least two clamping members movable towards each other to provide a second clamping action along a second clamping-axis parallel to the centering-movement plane for urging against respective opposite side surface segments of the molded-lens such that the at least two clamping members clamp the molded-lens. The machine may further include an alignment guidance module having a sensor to detect relative positions between the molded lens of the lens mold assembly held by the first and second engagement members and the second clamping-axis of the at least two clamping members along the movement direction to control synchronous movement of the first and second engagement members of the mold engagement mechanism along the movement direction for aligning the molded lens of the lens mold assembly with the second clamping-axis of the molded-lens holder mechanism such that the at least two clamping members of the molded-lens holder mechanism are capable of clamping the molded-lens. According to various embodiments, the first and second engagement members of the mold engagement mechanism may be configured to individually hold the first and second mold parts and may be further movable away from each other in opposite directions to separate the first and second mold parts from the molded lens held by the at least two clamping members of the molded-lens holder mechanism.

According to various embodiments, there is provided a method of disassembling an lens mold assembly including a first mold part, a second mold part, and a molded-lens sandwiched between the first mold part and the second mold part. The method may include pushing and aligning the lens mold assembly laterally to a pre-determined position in a centering-movement plane via a centering unit having at least two pusher members movable relative to each other along the centering-movement plane to converge towards the pre-determined position. The method may include clamping the lens mold assembly via a mold engagement mechanism having a first engagement member and a second engagement member movable towards each other to provide a first clamping action along a first clamping-axis perpendicular to the centering-movement plane such that the first and second engagement members are respectively engaged with the first and second mold parts. The method may include detecting, via a sensor of an alignment guidance module, relative positions, along a movement direction parallel to the first clamping-axis, between the molded lens of the clamped lens mold assembly and a second clamping-axis of a molded-lens holder mechanism which is parallel to the centering-movement plane, the molded-lens holder mechanism having at least two clamping members movable towards each other to provide a second clamping action along the second clamping-axis. The method may include moving the clamped lens mold assembly via moving the first and second engagement members in a synchronous manner along the movement direction for aligning the molded lens of the lens mold assembly with the second clamping-axis of the molded-lens holder mechanism based on the detected relative positions. The method may include clamping the molded-lens of the lens mold assembly via the at least two clamping members of the molded-lens holder mechanism by urging the at least two clamping members against respective opposite side surface segments of the molded-lens. The method may include separating the first and second mold parts from the molded lens held by the at least two clamping members of the molded-lens holder mechanism via holding the first and second mold parts respectively by the first and second engagement members of the mold engagement mechanism and moving the first and second engagement members away from each other in opposite directions.

BRIEF DESCRIPTION OF THE DRAWINGS

For a more complete understanding of the description provided herein and the advantages thereof, reference is now

DETAILED DESCRIPTION OF EMBODIMENTS

In the description which follows the drawing figures are not necessarily to scale and certain features may be shown in generalized or schematic form in the interest of clarity and conciseness or for informational purposes. In addition, although making and using various embodiments are discussed in detail below, it should be appreciated that as described herein are provided many inventive concepts that may be embodied in a wide variety of contexts. Embodiments discussed herein are merely representative and do not limit the scope of the invention. It will also be obvious to one skilled in the art that all the technical features that are defined relative to a process can be transposed, individually or in combination, to a device and conversely, all the technical features relative to a device can be transposed, individually or in combination, to a process.

It should be understood that the terms "on", "over", "top", "bottom", "down", "side", "back", "left", "right", "front", "lateral", "side", "up", "down" etc., when used in the following description are used for convenience and to aid understanding of relative positions or directions, and not intended to limit the orientation of any device, or structure or any part of any device or structure. In addition, the singular terms "a", "an", and "the" include plural references unless context clearly indicates otherwise. Similarly, the word "or" is intended to include "and" unless the context clearly indicates otherwise.

Various embodiments seek to provide a machine and a method for disassembling a lens mold assembly comprising a first mold part, a second mold part, and a molded-lens sandwiched between the first mold part and the second mold part, which allows automated separation of the first and second mold parts from the molded-lens so as to retrieve the molded lens. According to various embodiments, the lens mold assembly may be an intermediate assembly in the entire lens manufacturing process. According to various embodiments, the lens mold assembly may be the intermediate assembly formed by solidification of the liquid molding materials into the molded-lens between first mold part and the second mold part. According to various embodiments, in the lens mold assembly, the molded-lens formed between the first mold part and the second mold part may be further worked, e.g. etching, edging, grinding, etc, after being removed from the first mold part and the second mold part. Various embodiments seek to provide a quick and accurate solution for disassembly of the lens mold assembly to retrieve the molded lens, which is repeatable for various types and/or dimension of molded lens including convex lenses with thin lens edge. Various embodiments may not require a user to calibrate the machine or to input parameters into the machine based on the type and/or dimension of the molded lens to be disassembled. Various embodiments may perform disassembly of an lens mold assembly in a fully automated manner whereby the user may provide the lens mold assembly with any types and/or dimension of molded lens sandwiched therebetween, and automated separation of the lens mold assembly may be achieved. According to various embodiments, the user may continuously perform sequential disassembly of multiple lens mold assemblies whereby each lens mold assembly may have a different type and/or dimension of molded lens without requiring intermission to perform any re-setting or re-calibration based on the different type and/or dimension of molded lens.

Figure 1:
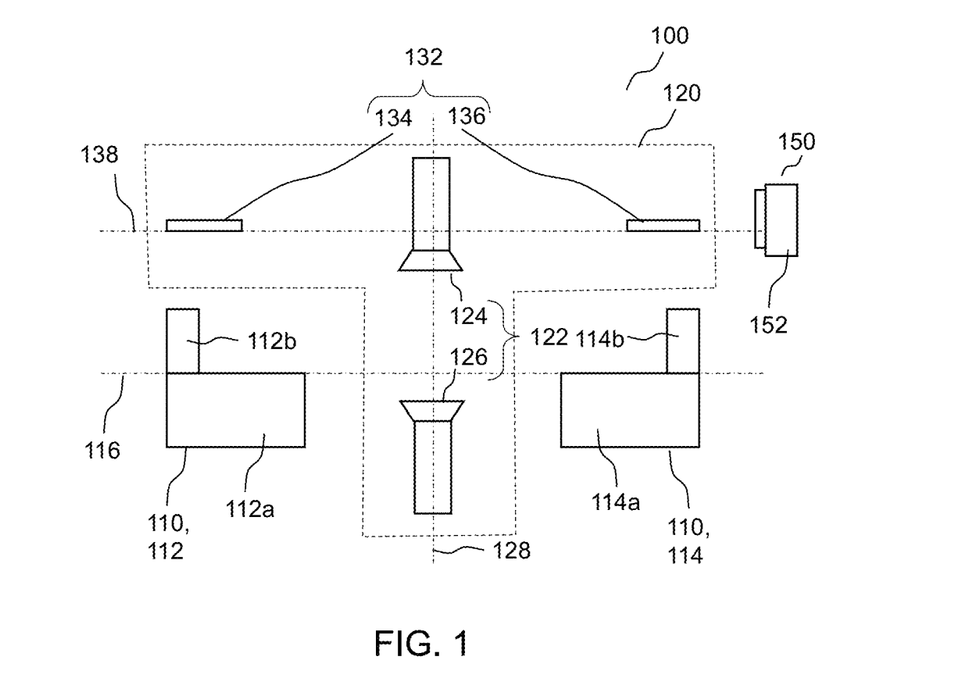
FIG. 1 depicts a schematic diagram of a machine for disassembling a lens mold assembly according to various embodiments.

FIG. 1 depicts a schematic diagram of a machine 100 or an apparatus for disassembling a lens mold assembly 102 (for example, see FIG. 2A) according to various embodiments. The lens mold assembly 102 may include a first mold part 104, a second mold part 106, and a molded-lens 108 sandwiched between the first mold part 104 and the second mold part 106. According to various embodiments, the lens mold assembly 102 may be an intermediate work product of a lens casting process, wherein liquid material is poured into a mold having two halves and then allowed to solidify. Accordingly, the lens mold assembly 102 may be a sandwich having the first mold part 104, the second mold part 106, and the molded-lens 108 therebetween. According to various embodiments, the machine 100 may be a standalone workstation or may be one of the workstations in an automation line. The workstation may be configured for automated separation of the first mold part 104, the second mold part 106 from the lens mold assembly 102 so as to retrieve the molded-lens 108. According to various embodiments, the lens mold assembly 102 may be manually fed into the machine 100 or may be fed into the machine 100 via various conveying system or transportation system. According to various embodiments, the separated first mold part 104, the separated second mold part 106, and the separated molded-lens 108 may be removed manually or via the various conveying system or transportation system.

According to various embodiments, the machine 100 may include a centering unit 110 having at least two pusher members 112, 114. According to various embodiments, the at least two pusher members 112, 114 may be movable relative to each other along a centering-movement plane 116 to converge towards a pre-determined position in the centering-movement plane 116. According to various embodiments, the lens mold assembly 102 may be fed into the machine 100 in a manner so as to be oriented horizontally level or parallel to the centering-movement plane 116. Accordingly, movement of the at least two pusher member 112, 114 along the centering-movement plane 116 to converge towards the pre-determined position may push the lens mold assembly 102 laterally or horizontally and align the lens mold assembly 102 to the pre-determined position in the centering-movement plane 116. Hence, the centering unit 110 may move and center the lens mold assembly 102 to the pre-determined position in the centering-movement plane 116. According to various embodiments, the at least two pusher members 112, 114 may include any device or structure configured to push the lens mold assembly 102. For example, each of the at least two pusher members 112, 114 may include a moveable stage 112a, 114a, having a flat surface on which the lens mold assembly 102 may be placed or supported. The moveable stages 112a, 114a may be moveable relative towards each other along the centering-movement plane 116 such that the moveable stages 112a, 114a may underneath the lens mold assembly 102. Each of the at least two pusher members 112, 114 may further include vertical pins 112b, 114b extending perpendicularly from the flat surface of the moveable stages 112a, 114a respectively. According to various embodiments, each vertical pin 112b, 114b may be integrally formed with the corresponding moveable stage 112a, 114a. According to various embodiments, each vertical pin 112b, 114b may be fixedly coupled or joined to the corresponding moveable stage 112a, 114a. As the at least two pusher member 112, 114 move relative to each other, the lens mold assembly 102 may slide relative to the flat surfaces of the moveable stages 112a, 114a and may be pushed laterally by the vertical pins 112b, 114b of the at least two pusher members 112, 114. According to various embodiments, the at least two pusher member 112, 114 may be coupled to an actuating mechanism for moving and controlling the at least two pusher member 112, 114 of the centering unit 110 to converge and center the lens mold assembly 102.

According to various embodiments, the machine 100 may include a disassembling module 120. According to various embodiments, the disassembling module 120 may include a mold engagement mechanism 122 having a first engagement member 124 and a second engagement member 126 movable towards each other to provide a first clamping action along a first clamping-axis 128. The first clamping-axis 128 may be perpendicular to the centering-movement plane 116 such that the first and second engagement members 124, 126 may be capable to respectively engage the first and second mold parts 104, 106 to clamp the lens mold assembly 102. According to various embodiments, the first and second engagement members 124, 126 may be movable relative to each other along the first clamping-axis 128 to converge towards the centering-movement plane 116 which intersects the first clamping axis 128. Accordingly, the first and second engagement members 124, 126 may move in opposite directions towards each other so as to be on converging paths towards the centering-movement plane 116. In this manner, the first and second engagement members 124, 126 may clamp or sandwich the lens mold assembly 102 which was centered at the pre-determined position in the centering-movement plane 116 by the centering unit 110. According to various embodiments, the pre-determined position in the centering-movement plane 116, which the at least two pusher members 112, 114 of the centering unit 110 converges, may be an intersection of the first clamping axis 128 and the centering-movement plane 116. According to various embodiments, each of the first and second engagement members 124, 126 may be coupled to a linear actuator for moving along the first clamping-axis 128. For example, each of the first and second engagement members 124, 126 may be coupled to a plunger or a piston or an extension rod or any other suitable elements or mechanism.

According to various embodiments, the first and second engagement members 124, 126 may be further movable in a synchronous manner along a movement direction parallel to the first clamping-axis 128 so as to move the clamped lens mold assembly 102. Accordingly, in addition to moving in opposite directions towards each other, the first and second engagement members 124, 126 may be movable in a same direction simultaneously in a coordinated manner such that the lens mold assembly 102 clamped or held between the first and second engagement members 124, 126 may be moved along the movement direction by the first and second engagement members 124, 126. The movement direction of the first and second engagement members 124, 126 may, similar to the first clamping-axis 128, be perpendicular to the centering-movement plane 116 such that the lens mold assembly 102 held by the first and second engagement members 124, 126 may be elevated or raised above the centering-movement plane 116 by the first and second engagement members 124, 126 moving along the movement direction. Accordingly, the first and second engagement members 124, 126 may move the clamped lens mold assembly 102 vertically with respect to the centering-movement plane 116. According to various embodiments, moving the clamped lens mold assembly 102 vertically may include upward movements as well as downward movements. According to various embodiments, the first and second engagement members 124, 126 may move the clamped lens mold assembly 102 to a pre-determined disassembly position.

According to various embodiments, each of the first and second engagement members 124, 126 may include a pad or a cup or a contact surface or any suitable element for respectively engaging the first and second mold parts 104, 106.

According to various embodiments, the centering unit 110 may also be moveable along the movement direction in a synchronous manner with the first and second engagement members 124, 126. Accordingly, as the first and second engagement members 124, 126 move the lens mold assembly held therebetween, the centering unit 110 may move in the same direction simultaneously in a coordinated manner such that the at least two pusher members 112, 114 of the centering unit 110 may remain in contact with the lens mold assembly 102 so as to maintain the lens mold assembly 102 with regards to its lateral disposition.

According to various embodiments, the disassembling module 120 may include a molded-lens holder mechanism 132. The molded-lens holder mechanism 132 may have at least two clamping members 134, 136 movable towards each other to provide a second clamping action along a second clamping-axis 138. The second clamping-axis 138 may be parallel to the centering-movement plane 116. Accordingly, the at least two clamping members 134, 136 may be capable to clamp the molded-lens 108 via urging against respective opposite side surface segments of the molded-lens 108. According to various embodiments, the second clamping-axis 138 may be perpendicular to the movement direction of the first and second engagement members 124, 126 which elevates or raises the clamped lens mold assembly 102 above the centering-movement plane 116. Accordingly the second clamping-axis 138 may intersect the movement direction of the first and second engagement members 124, 126. According to various embodiments, the pre-determined disassembly position may be an intersection of the second clamping-axis 138 and the movement direction of the first and second engagement members 124, 126.

According to various embodiments, the molded-lens holder mechanism 132 of the disassembling module 120 may be disposed above the centering unit 110. According to various embodiments, the mold engagement mechanism 122 of the disassembling module 120 may elevate or raise or lift the lens mold assembly 102 from the pre-determined position in the centering-movement plane 116 of the centering unit 110 to the pre-determined disassembly position along the movement direction of the first and second engagement members 124, 126. According to various embodiments, the molded-lens holder mechanism 132 of the disassembling module 120 may then engage and clamp onto the molded-lens 108 of the lens mold assembly 102 along the second clamping-axis 138 which is perpendicular to the movement direction.

According to various embodiments, the at least two clamping members 134, 136 may be coupled to an actuating mechanism for moving and controlling the at least two clamping members 134, 136 to close and clamp onto the molded-lens 108. According to various embodiments, the at least two clamping members 134, 136 of the molded-lens holder mechanism 132 may be operable to adjust a clamping force along the second clamping-axis 138 to clamp the molded-lens 108 of the lens mold assembly 102. According to various embodiments, the actuating mechanism may vary an actuating force to adjust the clamping force of the at least two clamping members 134, 136 of the molded-lens holder mechanism 132. According to various embodiments, with an adjustable clamping force, the at least two clamping members 134, 136 of the molded-lens holder mechanism 132 may be operable for controlled application of clamping force to the molded-lens 108 so as to facilitate separation from the first and second mold parts 104, 106.

According to various embodiments, each of the at least two clamping member 134, 136, may include a tip shaped and configured to engage the respective side surface segments of the molded-lens 108. For example, the tip may be in the form of a curve blade having a curvature which corresponds to a curvature of the side surface segment of the molded-lens 108. According to various embodiments, the tip of each of the at least two clamping members 134, 136 may include a metal tip. According to various embodiments, the metal tip may have a thickness equal or less than 1 mm According to various embodiments, the tip of each of the at least two clamping members 134, 136 may include a urethane rubber tip. According to various embodiments, the urethane rubber tip may have a thickness equal or less than 5 mm.

According to various embodiments, the machine 100 may include an alignment guidance module 150. The alignment guidance module 150 may include a sensor 152 to detect relative positions between the molded lens 108 of the clamped lens mold assembly 102 and the second clamping-axis 138 of the molded-lens holder mechanism 132 along the movement direction. According to various embodiments, the sensor 152 of the alignment guidance module 150 may detect said relative positions to control synchronous movement of the first and second engagement members 124, 126 of the mold engagement mechanism 122 along the movement direction so as to align the molded lens 108 of the lens mold assembly 102 with the second clamping-axis 138 of the molded-lens holder mechanism 132 for clamping by the at least two clamping members of the molded-lens holder mechanism. Accordingly, alignment of the molded lens 108 of the lens mold assembly 102 with the second clamping-axis 138 of the molded-lens holder mechanism 132 may be along the movement direction to bring the molded lens 108 of the lens mold assembly 102 in line with the second clamping-axis 138 of the molded-lens holder mechanism 132.

According to various embodiments, the sensor 152 of the alignment guidance module 150 may include an image sensor, a proximity sensor, an infrared sensor, a light sensor, or any other suitable sensors. According to various embodiments, the sensor 152 of the alignment guidance module 150 may be configured to detect a boundary line between the molded-lens 108 and the first mold part 104. According to various embodiments, the sensor 152 may be configured to detect a boundary line between the molded-lens 108 and the second mold part 106. According to various embodiments, the sensor 152 of the alignment guidance module 150 may detect a perpendicular distance between the boundary line and the second clamping-axis 138 of the molded-lens holder mechanism 132 as a measure of the relative position between the molded lens 108 of the clamped lens mold assembly 102 and the second clamping-axis 138 of the molded-lens holder mechanism 132. According to various embodiments, the sensor 152 of the alignment guidance module 150 may detect the perpendicular distance via direct measurement of the boundary line from the second clamping-axis 138, or via in-direct measurement of the boundary line from a physical reference point whereby a distance of the second clamping-axis 138 to the physical reference point is known. According to various embodiments, the sensor 152 of the alignment guidance module 150 may be so fixed with respect to the second clamping-axis 138 of the molded-lens holder mechanism 132.

According to various embodiments, the alignment guidance module 150 may provide feedback control to move the first and second engagement members 124, 126 of the mold engagement mechanism 122 along the movement direction so as to bring the boundary line between the molded-lens 108 and the first mold part 104 or the boundary line between the molded-lens 108 and the second mold part 106 into alignment with the second clamping-axis 138 of the molded-lens holder mechanism 132. Accordingly, the tips of the at least two clamping members 134, 136 may be respectively below or above the second clamping-axis 138 of the molded-lens holder mechanism 132 for engaging with the molded-lens 108 of the lens mold assembly 102.

According to various embodiments, with the at least two clamping members 138 of the molded-lens holder mechanism 132 holding the lens mold assembly 102 by the molded-lens between the first and second mold parts 104, 106, the at least two pusher members 112, 114 of the centering unit 110 may be moved apart from each other so as to cease contact or engagement with the lens mold assembly 102. According to various embodiments, the at least two clamping members 138 of the molded-lens holder mechanism 132 may be independently moved away from each other in respective directions perpendicular to the movement direction of the first and second engagement members 124, 126 of the mold engagement mechanism 122.

According to various embodiments, the first and second engagement members 124, 126 of the mold engagement mechanism 122 may be configured to individually hold the first and second mold parts 104, 106. According to various embodiments, the first and second engagement members 124, 126 may respectively hold the first and second mold parts 104, 106 via suction, or magnetic force, or adhesive force, or snap-fitting or other suitable fastening means. According to various embodiments, each of the first and second engagement members 124, 126 may include a suction element, or a magnetic element, or an adhesive element, or a snap-fitting element or any other suitable elements to hold the first and second mold parts respectively. According to various embodiments, with the first and second mold parts 104, 106 held respectively by the first and second engagement members 124, 126, the first and second engagement members 124, 126 may further be movable away from each other in opposite directions to separate the first and second mold parts 104, 106 from the molded lens 108 held by the at least two clamping members 138 of the molded-lens holder mechanism 132. According to various embodiments, the first and second engagement members 124, 126 may be independently moved away from each other in respective directions perpendicular to the second clamping-axis 138 of the molded-lens holder mechanism 132. Accordingly, the first mold part 104 may be moved upwards with respect to the molded lens 108 by the first engagement member 124, and the second mold part 106 may be moved downwards with respect to the molded lens 108 by the second engagement member 124. According to various embodiments, the centering unit 110 may move in a synchronous manner with the second engagement members 126. Accordingly, as the first and second engagement members 124, 126 move to separate the first and second mold parts 104, 106, the centering unit 110 may move in the same direction simultaneously in a coordinated manner with the second engagement members 126 such that the second mold part 106 may be moved downwards. According to various embodiments, with the first and second mold part 104, 106 separated and removed, the molded lens 108 may be isolated and retrieved for subsequent processing.

FIG. 2A to FIG. 2G depict schematic diagrams illustrating a method 201 of disassembling the lens mold assembly 102 comprising the first mold part 104, the second mold part 106, and the molded-lens 108 sandwiched between the first mold part 104 and the second mold part 106 according to various embodiments. According to various embodiments, FIG. 2A to FIG. 2G depict the method 201 of disassembling the lens mold assembly 102 using the machine 100 of FIG. 1.

Figure 2A:
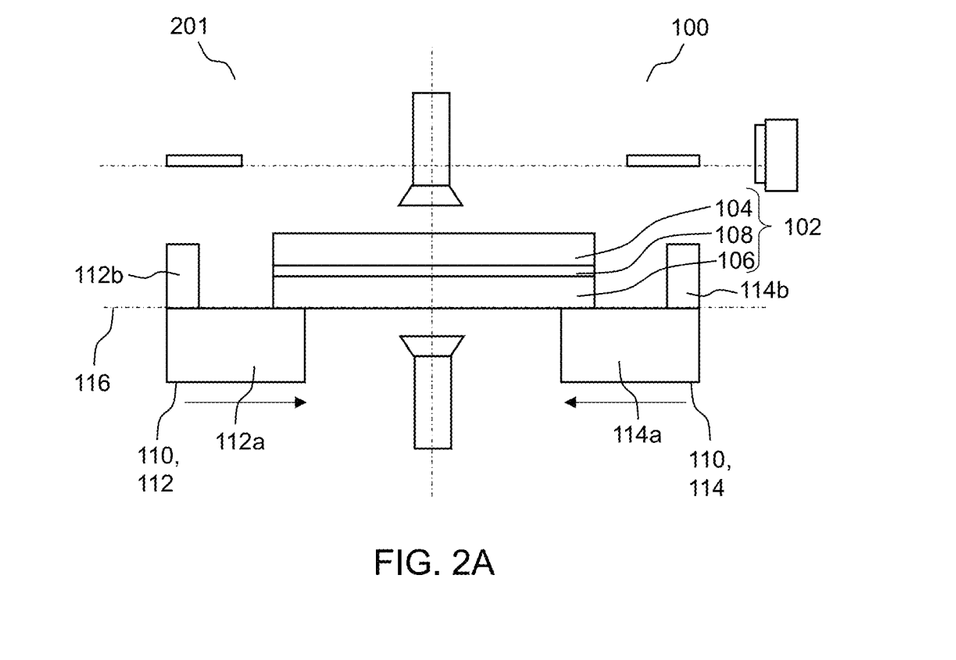
FIG. 2A to FIG. 2G depict schematic diagrams illustrating a method of disassembling the lens mold assembly according to various embodiments.

FIG. 2A depicts the lens mold assembly 102 being placed on the at least two pusher members 112, 114 of the centering unit 110 according to various embodiments. As shown, the lens mold assembly 102 may be placed on the moveable stages 112a, 114a of the at least two pusher members 112, 114. According to various embodiments, the at least two pusher members 112, 114 may be moved relative to each other along a centering-movement plane 116 to converge towards a pre-determined position in the centering-movement plane 116. As the at least two pusher member 112, 114 move relative to each other, the lens mold assembly 102 may slide relative to the flat surfaces of the moveable stages 112a, 114a of the at least two pusher member 112, 114 and may be pushed laterally by the vertical pins 112b, 114b of the at least two pusher members 112, 114 as the vertical pins 112b, 114b engages the sides of the lens mold assembly 102. According to various embodiments, the method 201 may include pushing and aligning the lens mold assembly 102 laterally to the pre-determined position in the centering-movement plane 116 via the centering unit 110 having the at least two pusher members 112 movable relative to each other along the centering-movement plane 116 to converge towards the pre-determined position.

Figure 2B:
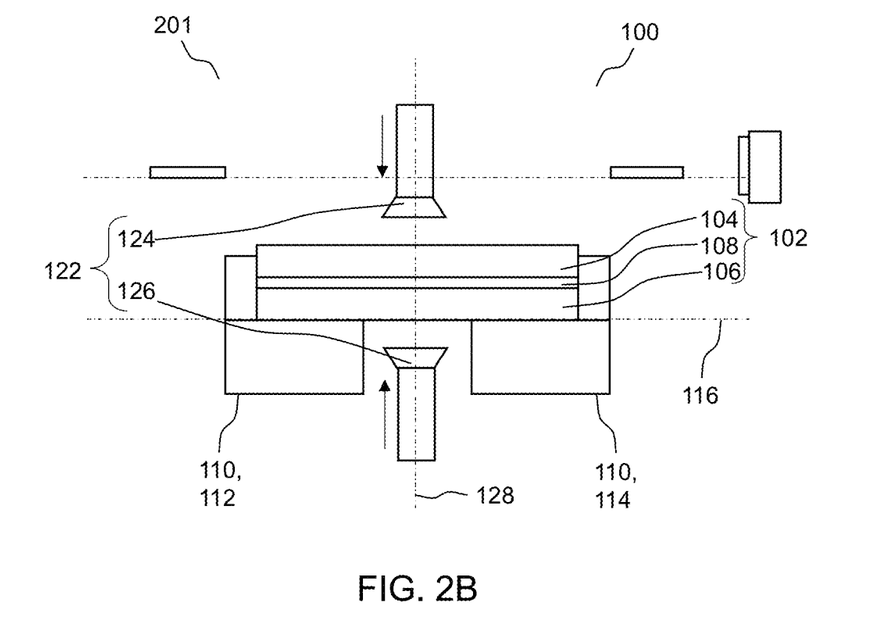

FIG. 2B depicts the lens mold assembly 102 being centered at the pre-determined position in the centering-movement plane 116 by the at least two pusher members 112, 114 of the centering unit 110 according to various embodiments. With the lens mold assembly 102 centered at the pre-determined position in the centering-movement plane 116, the first and second engagement members 124, 126 of the mold engagement mechanism 122 of the disassembling module 120 may move towards each other to provide the first clamping action along the first clamping-axis 128, which is perpendicular to the centering-movement plane 116, such that the first and second engagement members 124, 126 may be capable to respectively engage the first and second mold parts 104, 106 to clamp the lens mold assembly 102 at the pre-determined position in the centering-movement plane 116. According to various embodiments, the method 201 may further include clamping the lens mold assembly 102 via the mold engagement mechanism 122 having the first engagement member 124 and the second engagement member 126 movable towards each other to provide the first clamping action along the first clamping-axis 128 perpendicular to the centering-movement plane 116 such that the first and second engagement members 124, 126 are respectively engaged with the first and second mold parts 104, 106 of the lens mold assembly 102.

Figure 2C:
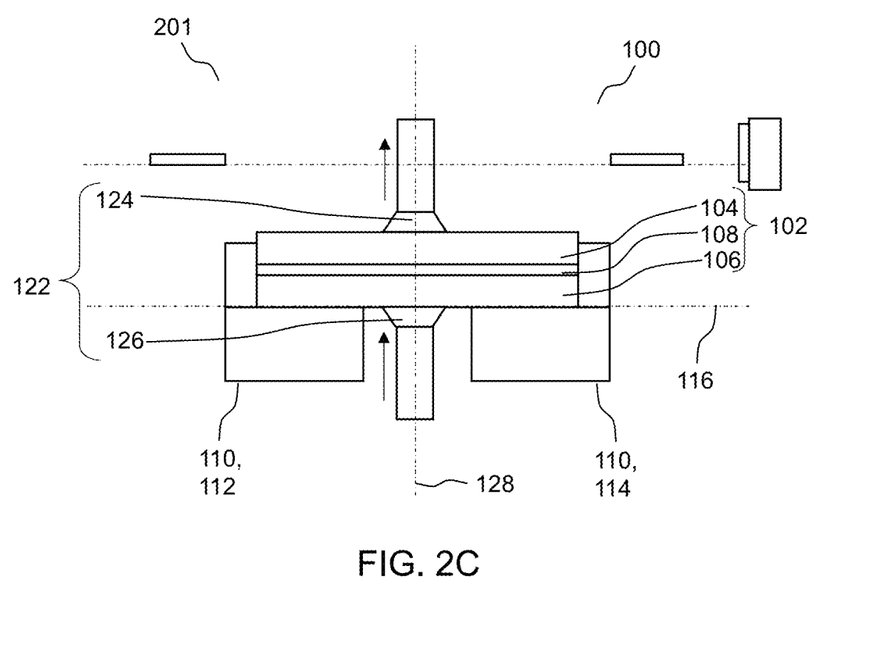

FIG. 2C depicts the lens mold assembly 102 being clamped by the first and second engagement members 124, 126 of the mold engagement mechanism 122 of the disassembling module 120 at the pre-determined position in the centering-movement plane 116 according to various embodiments. With the lens mold assembly 102 clamped by the first and second engagement members 124, 126, the first and second engagement members 124, 126 may be moved in a synchronous manner along the movement direction parallel to the first clamping-axis 128 so as to elevate or raise or lift the clamped lens mold assembly 102. According to various embodiments, the first and second engagement members 124, 126 may move the lens mold assembly 102 held therebetween along the movement direction to the pre-determined disassembly position. Accordingly to various embodiments, the centering unit 110 may move together with the first and second engagement members 124, 126 along the movement direction in a synchronous manner as the first and second engagement members 124, 126 move the lens mold assembly 102 held therebetween. According to various embodiments, the pre-determined disassembly position may be the intersection of the second clamping-axis 138 of the at least two clamping members 134, 136 of the molded-lens holder mechanism 132 of the disassembling module 120 and the movement direction of the first and second engagement members 124, 126 of the mold engagement mechanism 122 of the disassembling module 120.

Figure 2D:
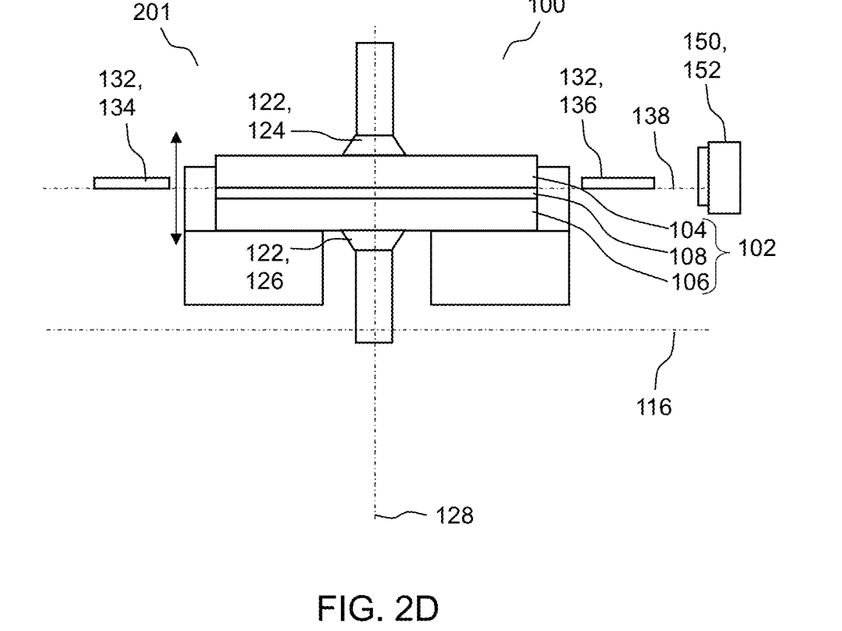

FIG. 2D depicts the lens mold assembly 102 being moved near to the pre-determined position in the centering-movement plane 116 by the first and second engagement members 124, 126 of the mold engagement mechanism 122 of the disassembling module 120 according to various embodiments. When the lens mold assembly 102 is near the pre-determined disassembly position, the sensor 152 of the alignment guidance module 150 may detect relative positions between the molded lens 108 of the lens mold assembly 102 held by the first and second engagement members 124, 126 and the second clamping-axis 138 of the at least two clamping members 134, 136 of the molded-lens holder mechanism 132 along the movement direction to control synchronous movement of the first and second engagement members 124, 126 of the mold engagement mechanism 122 along the movement direction so as to align the molded lens 108 of the lens mold assembly 102 with the second clamping-axis 138 of the at least two clamping members 134, 136 of the molded-lens holder mechanism 132 for clamping by the at least two clamping members of the molded-lens holder mechanism. Thus, the first and second engagement members 124, 126 may move the lens mold assembly 102 held therebetween along the movement direction based on the detected relative position to align the molded lens 108 of the lens mold assembly 102 with the second clamping-axis 138 of the at least two clamping members 134, 136 of the molded-lens holder mechanism 132. According to various embodiments, the synchronous movement of the first and second engagement members 124, 126 may include movements in both directions and may include minute movements to fine tune the alignment between the molded lens 108 of the clamped lens mold assembly 102 and the second clamping-axis 138 of the at least two clamping members 134, 136 of the molded-lens holder mechanism 132. According to various embodiments, the centering unit 110 may move together with the first and second engagement members 124, 126 in a synchronous manner along the movement direction during alignment of the molded lens 108 of the lens mold assembly 102 with the second clamping-axis 138 of the at least two clamping members 134, 136 of the molded-lens holder mechanism 132.

According to various embodiments, the method 201 may include detecting, via the sensor 152 of the alignment guidance module 150, relative positions, along the movement direction parallel to the first clamping-axis 128, between the molded lens 108 of the lens mold assembly 102 held by the first and second engagement members 124, 126 and the second clamping-axis 138 of the molded-lens holder mechanism 132 which is parallel to the centering-movement plane 116. The molded-lens holder mechanism 132 may include the at least two clamping members 134, 136 movable towards each other to provide the second clamping action along the second clamping-axis 138. According to various embodiments, detecting relative positions may include detecting a boundary line between the molded-lens 108 and the first mold part 104. According to various embodiment, detecting relative positions may include detecting a boundary line between the molded-lens 108 and the second mold part 106. According to various embodiments, detecting relative positions may include detecting a perpendicular distance between the boundary line and the second clamping-axis 138 of the molded-lens holder mechanism 132 as a measure of the relative position between the molded lens 108 of the clamped lens mold assembly 102 and the second clamping-axis 138 of the molded-lens holder mechanism 132. According to various embodiments, detection of the perpendicular distance may be via direct measurement of the boundary line from the second clamping-axis 138, or via indirect measurement of the boundary line from a physical reference point whereby a distance of the second clamping-axis 138 to the physical reference point is known.

According to various embodiments, the method 201 may include moving the lens mold assembly 102 held by the first and second engagement members 124, 126 via moving the first and second engagement members 124, 126 in a synchronous manner along the movement direction so as to align the molded lens 108 of the lens mold assembly 102 with the second clamping-axis 138 of the molded-lens holder mechanism 132 based on the detected relative positions.

Figure 2E:
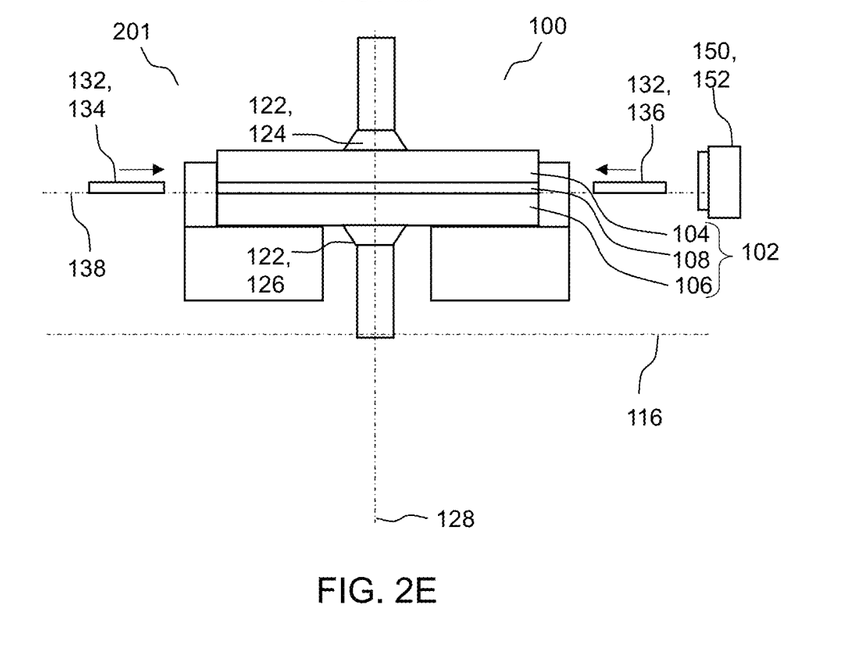

FIG. 2E depicts the lens mold assembly 102 being aligned to the second clamping-axis 138 of the molded-lens holder mechanism 132 by the first and second engagement members 124, 126 of the mold engagement mechanism 122 of the disassembling module 120 according to various embodiments. With the molded lens 108 of the lens mold assembly 102 aligned to the second clamping-axis 138 of the molded-lens holder mechanism 132, the at least two clamping members 134, 136 may move towards each other along the second clamping-axis 138 to clamp the molded-lens 108 of the lens mold assembly 102 via urging against respective opposite side surface segments of the molded-lens 108. According to various embodiments, the method 201 may include clamping the molded-lens 108 of the lens mold assembly 102 via the at least two clamping members 134, 136 of the molded-lens holder mechanism 132 by urging the at least two clamping members 134, 136 against respective opposite side surface segments of the molded-lens 108.

Figure 2F:
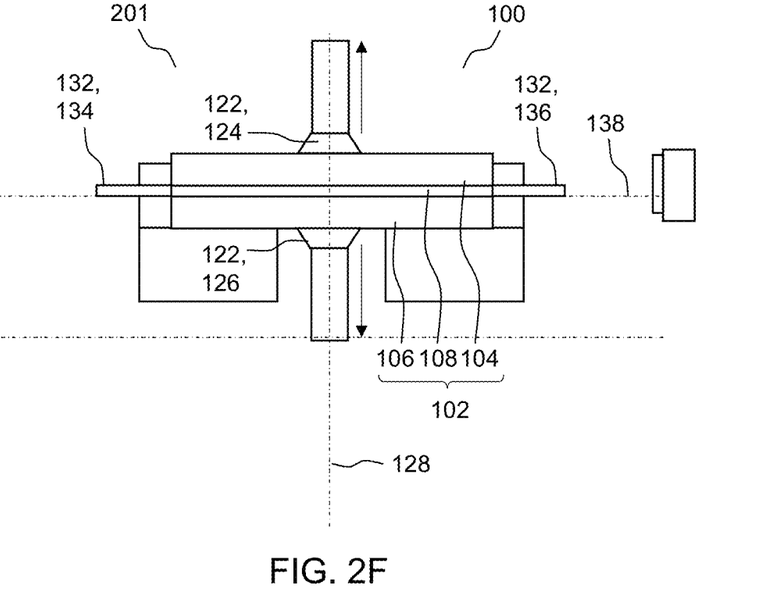

FIG. 2F depicts the molded-lens 108 of the lens mold assembly 102 being clamped by the at least two clamping members 134, 136 of the molded-lens holder mechanism 132 according to various embodiments. With the molded-lens 108 of the lens mold assembly 102 clamped between the at least two clamping members 124, 126, the first and second engagement members 124, 126 of the mold engagement mechanism 122, which are individually and independently holding the first and second mold parts 104, 106 of the lens mold assembly 102, may be moved away from each other in opposite directions to separate the first and second mold parts 104, 106 from the molded lens 108 held by the at least two clamping members 138 of the molded-lens holder mechanism 132. Further, the centering unit 110 may move together with the second engagement member 126 in a synchronous manner as the first and second engagement members 124, 126 are moving away from each other to separate the first and second mold parts 104, 106 from the molded lens 108 held by the at least two clamping members 128. Accordingly, the first mold part 104 may be separated and moved upwards with respect to the molded lens 108 by the first engagement member 124, and the second mold part 106 may be separated and moved downwards with respect to the molded lens 108 by the second engagement member 124 such that the molded lens 108 may be isolated and retrieved for subsequent processing. According to various embodiments, the method 201 may include separating the first and second mold parts 104, 106 from the molded lens 108 held by the at least two clamping members 134, 136 of the molded-lens holder mechanism 132 via holding the first and second mold parts 104, 106 respectively by the first and second engagement members 124, 126 of the mold engagement mechanism 122 and moving the first and second engagement members 124, 126 away from each other in opposite directions.

Figure 2G:
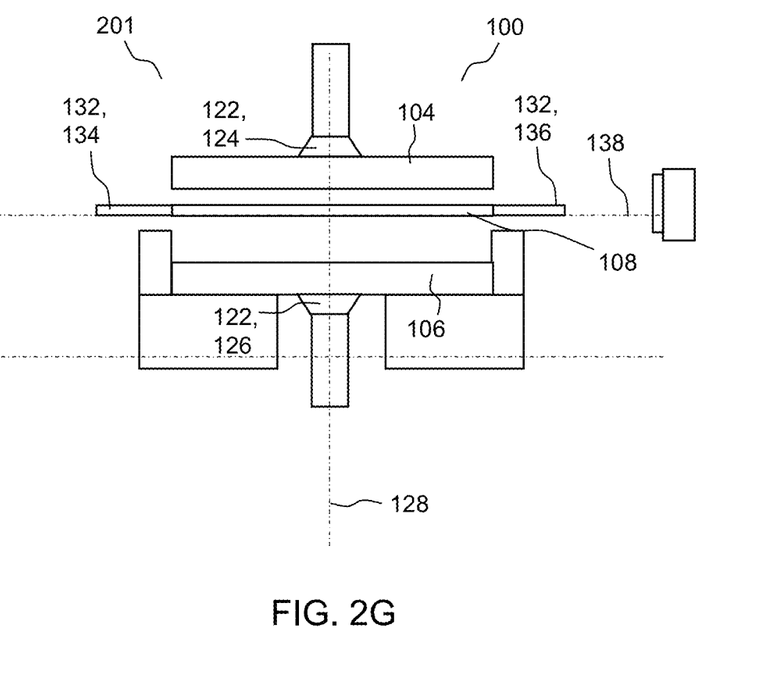

FIG. 2G depicts the first and second mold parts 104, 106 separated, by the first and second engagement members 124, 126, from molded-lens 108 of the lens mold assembly 102 which is clamped by the at least two clamping members 134, 136 of the molded-lens holder mechanism 132 according to various embodiments.

Figure 3:
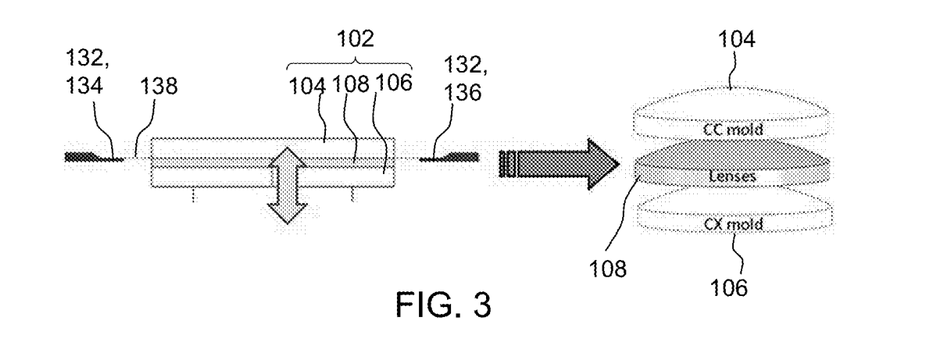
FIG. 3 depicts a schematic diagram of a broad overview of the method of disassembling the lens mold assembly according to various embodiments.

FIG. 3 depicts a schematic diagram of a broad overview of the method 201 of disassembling the lens mold assembly 102 comprising the first mold part 104, the second mold part 106, and the molded-lens 108 sandwiched between the first mold part 104 and the second mold part 106 according to various embodiments. As shown, the lens mold assembly 102 may be moved and position so as to align the molded lens 108 of the lens mold assembly 102 with the second clamping-axis 138 of the at least two clamping members 134, 136 of the molded-lens holder mechanism 132. According to various embodiments, this may be achieved via the centering unit 110 and the mold engagement mechanism 122 of the disassembling module 120 with guidance from the alignment guidance module 150. Once the molded-lens 108 of the lens mold assembly 102 is clamped and held by the at least two clamping members 134, 136 of the molded-lens holder mechanism 132, the first and second mold parts 104, 106 may be separated from the molded-lens 108 so as to isolate and retrieve the molded lens 108. As shown, the first mold part 104 may be a concave mold, i.e. cc mold, and the second mold part 106 may be a convex mold, i.e. cx mold.

Figure 4:
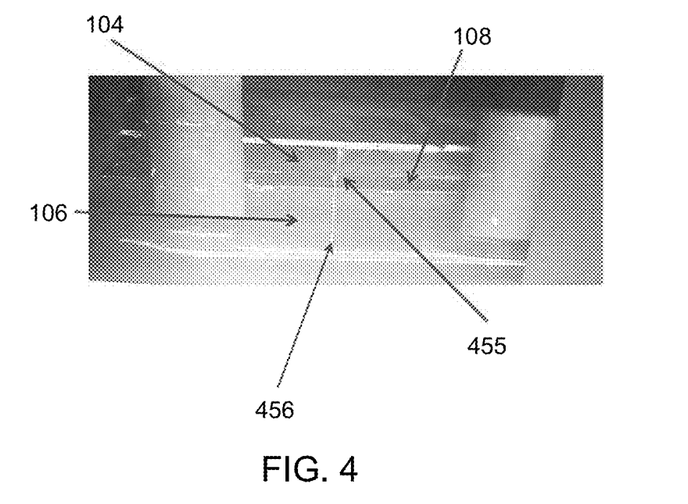
FIG. 4 depicts a photograph of an image of a camera which may serve as a sensor of an alignment guidance module of the machine for disassembling the lens mold assembly according to various embodiments.

FIG. 4 depicts a photograph of an image of a camera which may serve as the sensor 152 of the alignment guidance module 150 according to various embodiments. As shown, the alignment guidance module 150 may be configured to detect the boundary line 455 between the molded lens 108 and the first mold part 104. According to various embodiments, the alignment guidance module 150 may detect the boundary line 455 from a fixed reference point 456 of the machine 100 within a view of the camera.

Figure 5:
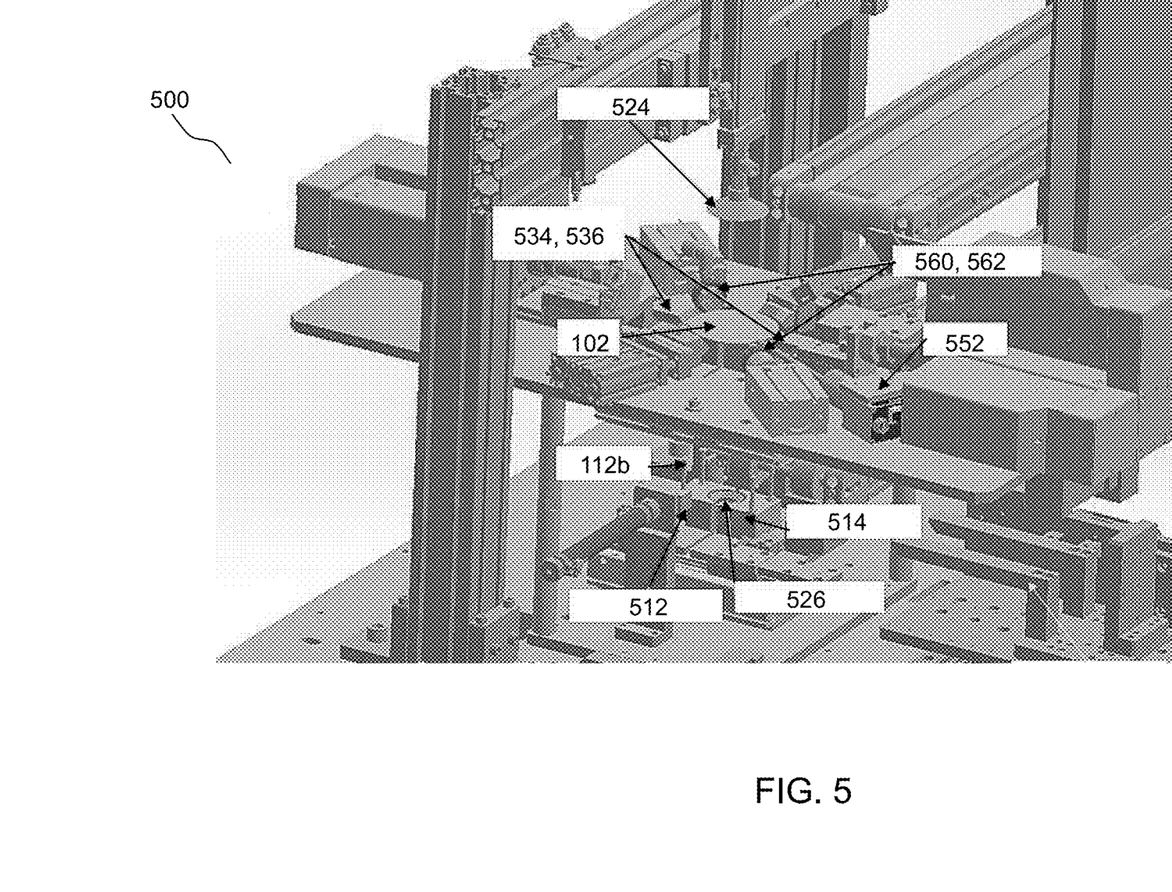
FIG. 5 depicts a machine for disassembling the lens mold assembly 102 according to various embodiments.

FIG. 5 depicts a machine 500 or an apparatus for disassembling the lens mold assembly 102 according to various embodiments. The lens mold assembly 102 may include the first mold part 104, the second mold part 106, and the molded-lens 108 sandwiched between the first mold part 104 and the second mold part 106. According to various embodiments, the machine 500 may, similar to the machine 100 of FIG. 1, include a centering unit having at least two pusher members 512, 514. Each of the at least two pusher members 512, 514 may include vertical pins 512b. According to various embodiments, the machine 500 may, similar to the machine 100 of FIG. 1, include a mold engagement mechanism having a first engagement member 524 and a second engagement member 526. According to various embodiments, the machine 500 may, similar to the machine 100 of FIG. 1, include a molded-lens holder mechanism may have at least two clamping members 534, 536. According to various embodiments, similar to the machine 100 of FIG. 1, the mold engagement mechanism and the molded-lens holder mechanism may form the disassembling module of the machine 500. According to various embodiments, the machine 500 may, similar to the machine 100 of FIG. 1, include an alignment guidance module having a sensor 552.

According to various embodiments, in the machine 500 of FIG. 5, the sensor 552 may include a vision sensor or an image capturing device or a camera. According to various embodiments, the sensor 552 of the alignment guidance module may include the camera disposed and so fixed in a pre-determined camera position with respect to a second clamping-axis of the at least two clamping members 534, 536 of the molded-lens holder mechanism for capturing one or more images to detect relative positions between the molded lens 108 of the clamped lens mold assembly 102 and the second clamping-axis of the at least two clamping members 534, 536 of the molded-lens holder mechanism. According to various embodiments, as the camera is at a fixed pre-determined camera position within the machine 500 with respect to the second clamping-axis of the at least two clamping members 534, 536 of the molded-lens holder mechanism, the camera may be capable of detecting relative positions between the molded lens 108 of the lens mold assembly 102 held by the first and second engagement member 524, 526 and the second clamping-axis of the at least two clamping members 534, 536 of the molded-lens holder mechanism from the images captured by the camera.

According to various embodiments, a method of disassembling the lens mold assembly 102 using the machine 500 of FIG. 5, may in addition to the method 201 of FIG. 2A to FIG. 2G, include that detecting relative positions may include capturing one or more images by the camera disposed and so fixed in the pre-determined camera position with respect to the second clamping-axis of the at least two clamping members 534, 536 of the molded-lens holder mechanism.

According to various embodiments, in the machine 500 of FIG. 5, each of the first and second engagement members 524, 526 of the mold engagement mechanism may include a vacuum suction element to engage and hold the first and second mold parts 104, 106 respectively. According to various embodiments, the vacuum suction element may include vacuum suction pads or vacuum suction cups.

According to various embodiments, the vacuum suction element may hold the first and second mold parts 104, 106 via vacuum suction.

According to various embodiments, the method of disassembling the lens mold assembly 102 using the machine 500 of FIG. 5, may in addition to the method 201 of FIG. 2A to FIG. 2G, include that holding the first and second mold parts 104, 106 respectively by the first and second engagement members 524, 526 of the mold engagement mechanism may include using vacuum suction to hold the first and second mold parts 104, 106 respectively.

According to various embodiments, the machine 500 of FIG. 5 may differ from the machine 100 of FIG. 1 in that the machine 500 of FIG. 5 may additionally include an air blowing mechanism 560. According to various embodiments, the air blowing mechanism 560 may be part of the disassembling module of the machine 500. According to various embodiments, the air blowing mechanism 560 may include at least two nozzles 562 movable towards each other to engage respective side portions of the clamped lens mold assembly 102 so as to direct two opposing compressed air jet at the clamped lens mold assembly 102, whereby the first and second mold parts 104, 106 are respectively held by the first and second engagement 524, 526 of the mold engagement mechanism and the molded lens 108 is clamped between the at least two clamping members 534, 536 of the molded-lens holder mechanism. According to various embodiments, the at least two nozzles 562 may be movable along a same movement plane as the second clamping-axis of the at least two clamping members 534, 536 of the molded-lens holder mechanism. According to various embodiments, the at least two nozzles 562 in engagement with respective side portions of the clamped lens mold assembly 102 may direct the two opposing compressed air jets to penetrate across interfaces between the molded-lens 108 and the first mold part 104, and between the molded-lens 108 and the second mold part 104. According to various embodiments, the two opposing compressed air jets may form a layer of air gap between the molded-lens 108 and the first mold part 104, and between the molded-lens 108 and the second mold part 104 so as to facilitate separation of the first and second mold parts 104, 106 from the molded-lens 108.

According to various embodiments, each of the at least two nozzles 562 may include a rubber tip to enclose respective air outlet when engaged with the clamped lens mold assembly 102. Accordingly, the rubber tip may form a seal between each of the at least two nozzles 562 and the respective side portion of the clamped lens mold assembly 102. Hence, each of the at least two nozzles 562 may fully engage the respective side portion of the clamped lens mold assembly 102 without leak, thus ensuring sufficient air pressure to penetrate the interfaces between the molded-lens 108 and the first mold part 104, and between the molded-lens 108 and the second mold part 104.

According to various embodiments, the method of disassembling the lens mold assembly 102 using the machine 500 of FIG. 5, may in addition to the method 201 of FIG. 2A to FIG. 2G, include directing two opposing compressed air jets at the clamped lens mold assembly 102 via the air blowing mechanism 560 having at least two nozzles 562 movable towards each other to engage respective side portions of the clamped lens mold assembly 102 such that the two compressed air jets penetrate across interfaces between the molded-lens 108 and the first mold part 104, and between the molded-lens 108 and the second mold part 106.

According to various embodiments, the machine 100, 500 may include a processor. In various embodiments, a "processor" may be understood as any kind of a logic implementing entity, which may be special purpose circuitry or a processor executing software stored in a memory, firmware, or any combination thereof. Thus, in an embodiment, a "processor" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "processor" may also be a processor executing software, e.g. any kind of computer program, e.g. a computer program using a virtual machine code such as e.g. Java. Any other kind of implementation of the respective functions which will be described in more detail below may also be understood as a "processor" in accordance with various embodiments. In various embodiments, the processor may be part of a computing system or a controller or a microcontroller or any other system providing a processing capability. According to various embodiments, such systems may include a memory which is for example used in the processing carried out by the device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

According to various embodiments, the processor may be configured to generate various control signals for operating the various components of the respective machine 100, 500. According to various embodiments, the processor may be configured to generate the various control signals so as to operate the respective machine 100, 500 in accordance to the various methods as described herein. According to various embodiments, the processor may be configured to generate the various control signals in a pre-determined sequence based on the various methods as described herein. According to various embodiments, the processor may receive the various detection signals from the various sensors (such as the sensors 152, 552), process the various detection signals, and generate corresponding control signals in response to the various detection signals for controlling various components of the respective machine 100, 500. For example, the processor may be configured to detect, via the sensor of the alignment guidance module, relative positions between the molded lens of the lens mold assembly held by the first and second engagement member and the second clamping-axis of the at least two clamping members of the molded-lens holder mechanism, whereby the relative positions are along the movement direction parallel to the first clamping-axis and the second clamping-axis is parallel to the centering-movement plane; and to move the lens mold assembly held by the first and second engagement members, via moving the first and second engagement members in a synchronous manner along the movement direction, for aligning the molded lens of the lens mold assembly with the second clamping-axis of the at least two clamping members of the molded-lens holder mechanism based on the detected relative positions.

What is claimed is:

1. A machine for disassembling a lens mold assembly comprising a first mold part, a second mold part, and a molded-lens sandwiched between the first mold part and the second mold part, the machine comprising:

a centering unit having at least two pusher members movable relative to each other along a centering-movement plane to converge towards a pre-determined position in the centering-movement plane for pushing the lens mold assembly laterally and aligning the lens mold assembly to the pre-determined position;

a disassembling module comprising a mold engagement mechanism having a first engagement member and a second engagement member movable towards each other to provide a first clamping action along a first clamping-axis perpendicular to the centering-movement plane for respectively engaging the first and second mold parts such that the first and second engagement members clamp the lens mold assembly, wherein the first and second engagement members are further movable in a synchronous manner along a movement direction parallel to the first clamping-axis for moving the lens mold assembly held by the first and second engagement members, and a molded-lens holder mechanism having at least two clamping members movable towards each other to provide a second clamping action along a second clamping-axis parallel to the centering-movement plane for urging against respective opposite side surface segments of the molded-lens such that the at least two clamping members clamp the molded-lens;

an alignment guidance module having a sensor to detect relative positions, along the movement direction, between the molded-lens of the lens mold assembly held by the first and second engagement members and the second clamping-axis of the at least two clamping members; and a processor configured to control synchronous movement of the first and second engagement members of the mold engagement mechanism along the movement direction for aligning the molded-lens of the lens mold assembly with the second clamping-axis of the molded-lens holder mechanism such that the at least two clamping members of the molded-lens holder mechanism are capable of clamping the molded-lens, wherein the first and second engagement members of the mold engagement mechanism are configured to individually hold the first and second mold parts and are further movable away from each other in opposite directions to separate the first and second mold parts from the molded-lens held by the at least two clamping members of the molded-lens holder mechanism.

2. The machine as claimed in claim 1, wherein the sensor of the alignment guidance module comprises a camera disposed and so fixed in a pre-determined camera position with respect to the second clamping-axis of the molded-lens holder mechanism for capturing one or more images to detect the relative positions between the molded-lens of the lens mold assembly held by the first and second engagement members and the second clamping-axis of the at least two clamping members of the molded-lens holder mechanism.

3. The machine as claimed in claim 2, wherein the sensor is configured to detect a boundary line between the molded-lens and the first mold part, or between the molded-lens and the second mold part.

4. The machine as claimed in claim 2, wherein each of the at least two clamping members of the molded-lens holder mechanism comprises a metal tip.

5. The machine as claimed in claim 2, wherein the at least two clamping members of the molded-lens holder mechanism are operable to adjust a clamping force along the second clamping-axis to clamp the molded-lens.

6. The machine as claimed in claim 2, wherein each of the first and second engagement members of the mold engagement mechanism comprises a vacuum suction element to engage and hold the first and second mold parts respectively.

7. The machine as claimed in claim 2, wherein the disassembling module further comprises an air blowing mechanism having at least two nozzles movable towards each other to engage respective side portions of the lens mold assembly held by the first and second engagement members for directing two opposing compressed air jets at the lens mold assembly, whereby the two compressed air jets penetrate across interfaces between the molded-lens and the first mold part and between the molded-lens and the second mold part.

8. The machine as claimed in claim 1, wherein the sensor is configured to detect a boundary line between the molded-lens and the first mold part, or between the molded-lens and the second mold part.

9. The machine as claimed in claim 1, wherein each of the at least two clamping members of the molded-lens holder mechanism comprises a metal tip.

10. The machine as claimed in claim 9, wherein the metal tip has a thickness equal or less than 1 mm.

11. The machine as claimed in claim 1, wherein the at least two clamping members of the molded-lens holder mechanism are operable to adjust a clamping force along the second clamping-axis to clamp the molded-lens.

12. The machine as claimed in claim 1, wherein each of the first and second engagement members of the mold engagement mechanism comprises a vacuum suction element to engage and hold the first and second mold parts respectively.

13. The machine as claimed in claim 1, wherein the disassembling module further comprises an air blowing mechanism having at least two nozzles movable towards each other to engage respective side portions of the lens mold assembly held by the first and second engagement members for directing two opposing compressed air jets at the lens mold assembly, whereby the two compressed air jets penetrate across interfaces between the molded-lens and the first mold part and between the molded-lens and the second mold part.

14. The machine as claimed in claim 13, wherein each of the at least two nozzles comprise a rubber tip to enclose respective air outlet when engaged with the lens mold assembly held by the first and second engagement members.

15. A method of disassembling an lens mold assembly comprising a first mold part, a second mold part, and a molded-lens sandwiched between the first mold part and the second mold part, the method comprising:
pushing and aligning the lens mold assembly laterally to a pre-determined position in a centering-movement plane via a centering unit having at least two pusher members movable relative to each other along the centering-movement plane to converge towards the pre-determined position;
clamping the lens mold assembly via a mold engagement mechanism having a first engagement member and a second engagement member movable towards each other to provide a first clamping action along a first clamping-axis perpendicular to the centering-movement plane such that the first and second engagement members are respectively engaged with the first and second mold parts;
detecting, via a sensor of an alignment guidance module, relative positions, along a movement direction parallel to the first clamping-axis, between the molded-lens of the lens mold assembly held by the first and second engagement members and a second clamping-axis of at least two clamping members of a molded-lens holder mechanism which is parallel to the centering-movement plane, the at least two clamping members movable towards each other to provide a second clamping action along the second clamping-axis parallel to the centering-movement plane;
moving the lens mold assembly held by the first and second engagement members, via a processor configured for moving the first and second engagement members in a synchronous manner along the movement direction, for aligning the molded-lens of the lens mold assembly with the second clamping-axis of the at least two clamping members of the molded-lens holder mechanism based on the detected relative positions;
clamping the molded-lens of the lens mold assembly via the at least two clamping members of the molded-lens holder mechanism by urging the at least two clamping members against respective opposite side surface segments of the molded-lens;
separating the first and second mold parts from the molded-lens held by the at least two clamping members of the molded-lens holder mechanism via holding the first and second mold parts independently by the first and second engagement members of the mold engagement mechanism respectively and moving the first and second engagement members away from each other in opposite directions.

16. The method as claimed in claim 15, wherein the sensor of the alignment guidance module comprises a camera, and wherein detecting the relative positions comprises capturing one or more images by the camera disposed and so fixed in a pre-determined camera position with respect to the second clamping-axis of the molded-lens holder mechanism.

17. The method as claimed in claim 16, wherein detecting the relative positions comprises detecting a boundary line between the molded-lens and the first mold part, or between the molded-lens and the second mold part.

18. The method as claimed in claim 15, wherein detecting the relative positions comprises detecting a boundary line between the molded-lens and the first mold part, or between the molded-lens and the second mold part.

19. The method as claimed in claim 15, wherein each of the first and second engagement members of the mold engagement mechanism comprises a vacuum suction element, and wherein holding the first and second mold parts respectively by the first and second engagement members comprises using vacuum suction to hold the first and second mold parts respectively.

20. The method as claimed in claim 15, further comprising directing two opposing compressed air jets at the lens mold assembly held by the first and second engagement members via an air blowing mechanism having at least two nozzles movable towards each other to engage respective side portions of the lens mold assembly such that the two compressed air jets penetrate across interfaces between the molded-lens and the first mold part and between the molded-lens and the second mold part.

* * * * *